Patented Mar. 6, 1951

2,544,342

UNITED STATES PATENT OFFICE 2,544,342

CASTOR OIL ORTHO SILICATE GELS

Harry F. Miller and Ralph G. Flowers, Pittsfield, Mass., assignors to General Electric Company, a corporation of New York No Drawing. Application April 19, 1946, Serial No. 663,610

7 Claims. (Cl. 260—398)

This invention relates to the method of preparing gel-like compositions by effecting reaction for a period of time and at a temperature sufficient to yield gel-like materials between ingredients comprising (1) an organo-metallic ester of the class consisting of lower alkyl esters of ortho silicic acid and lower alkyl esters of boric acid and (2) an oil of the class consisting of castor oil and hydrogenated castor oil. The gel-like compositions of this invention are obtained by employing the reactants in the ratio of one mol of the organo-metallic ester to from about 1.5 to 2.5 mols of the oil, while removing the alcohol formed during the reaction. These compositions vary in physical characteristics from soft, jelly-like masses to firm gels.

The organo-metallic esters referred to above are esters of alcohols, preferably the lower boiling alcohols such as methyl, ethyl and propyl alcohols, and the metal-containing acids, ortho silicic acid, $H_4SiO_4$, and boric acid $H_3BO_3$. For purposes of our invention it is desirable that these esters be fairly high boiling and that the alcohol which is split off from the ester during the reaction be relatively low boiling.

Heretofore, certain organo-metallic esters such as ethyl ortho silicate, $Si(OC_2H_5)_4$, have been reacted with esters of ricinoleic acid such as castor oil with a view to substituting a silicyl group in the ricinoleic group. However, the products of these reactions have been oils of varying degrees of viscosity rather than solid gels such as those produced by the method of our invention.

According to our invention, the organo-metallic ester is mixed with castor oil or hydrogenated castor oil, preferably in the ratio of 1 mol of the organo-metallic ester to from approximately 1.5 to 2.5 mols of the oil. The mixture is then heated at temperatures between about 125° C. and 175° C. until the desired gel is formed. The reaction temperatures should more preferably be between 150° C. and 160° C. If it is desired to accelerate the reaction a small amount of catalyst, e. g., tertiary-butyl hydroperoxide, tertiary-butyl perbenzoate, or concentrated sulfuric acid may be added. During the reaction, alcohol split off from the organo-metallic ester is allowed to escape from the reaction mixture. It is important that the alcohol be permitted to escape from the reaction mixture as rapidly as it is produced in order to obtain the gel-like materials which are the object of the method of our invention. The length of time required for this reaction depends, for instance, on the proportions of the reactants, the temperature, and catalyst. More specifically, a firm gel is obtained in a shorter reaction time as the ratio of organo-metallic ester to castor oil or hydrogenated castor oil is increased. In addition, the time of reaction may be shortened by increasing the reaction temperature or by adding very small amounts of a catalyst.

Depending on the conditions employed, the time required for formation of the desired gels may vary from 3 to 100 hours. In order to avoid bubbles in the final product caused by evolution of alcohol during the reaction, it is advisable to regulate the above conditions in such a way that from 15 to 48 hours will be required for formation of the final gel.

During the above reaction the organo-metallic esters react with the hydroxyl groups of the glyceryl tri-ricinoleate, the chief constituent of castor oil, or with the glyceryl tri-hydroxy stearate, the chief constituent of hydrogenated castor oil, to form complex esters consisting of silicates or borates of castor oil or hydrogenated castor oil in various combinations. It is obvious that a wide variety of combinations of compounds may be formed during the reaction in view of the fact that there are three available hydroxyl groups per molecule of the triglyceride and from three to four available linkages for reaction per molecule of the organo-metallic ester, depending on which ester is employed.

Since the chemical structures of these new materials are very complicated by size and cross-linking, they have the physical properties of stable gels. The solubility of these gels in most solvents is very slight, although butyl Carbitol (diethylene glycol monobutyl ether) dissolves them to some extent. Furthermore, these gels retain their gel-like properties at elevated temperatures up to approximately 300° C.

In order that those skilled in the art may better understand how the present invention may be carried into effect, the following examples are given by way of illustration. All parts are by weight.

*Example 1*

40 parts of ethyl ortho silicate were mixed with 470 parts of hydrogenated castor oil in an open vessel. The molar ratio of the respective reactants was approximately 1 to 2.6. The mixture was then heated in the open vessel in an oil bath at 150° C. for 72 hours. The resulting product was a firm gel.

Example 2

36.5 parts of triethyl borate were mixed with 466 parts of castor oil in an open vessel. The molar ratio of the respective reactants was approximately 1 to 2. The mixture was then heated in the open vessel in an oven at 150° C. for 65 hours. The resulting product was a soft gel.

Example 3

36.5 parts of triethyl borate were mixed with 407 parts of castor oil in an open vessel. The molar ratio of the respective reactants was approximately 1 to 1.8. The mixture was then heated in the open vessel in an oven at 150° C. for 65 hours. The resulting product was a firm gel.

Example 4

36.5 parts of triethyl borate were mixed with 350 parts of castor oil in an open vessel. The molar ratio of the respective reactants was approximately 1 to 1.6. The mixture was then heated in an open vessel in an oven at 150° C. for three hours. The resulting product was a firm gel.

Example 5

36.5 parts of triethyl borate, 466 parts of castor oil, and approximately 2 per cent of tertiary-butyl hydroperoxide based on the total mixture were mixed in an open vessel. The molar ratio of triethyl borate to castor oil was 1 to 2. The mixture was then heated in the open vessel in an oven at 150° C. for 65 hours. The resulting product was a firm gel.

Example 6

52 parts of ethyl ortho silicate, 466 parts of castor oil, and approximately 0.4 per cent of tertiary-butyl hydroperoxide based on the total mixture were mixed in an open vessel. The molar ratio of the ethyl ortho silicate to castor oil was 1 to 2. The mixture was then heated in the open vessel in an oil bath at 150° C. for 36 hours. The resulting product was a firm gel.

Example 7

52 parts of ethyl ortho silicate, 466 parts of castor oil, and approximately 1 per cent of sulfuric acid were mixed in an open vessel. The molar ratio of the ethyl ortho silicate to castor oil was 1 to 2. The mixture was then heated in the open vessel in an oil bath at 150° C. for two hours. The resulting product was a firm gel.

Example 8

Two portions, to one of which approximately 2 per cent of tertiary-butyl hydroperoxide had been added, of a mixture of 52 parts of ethyl ortho silicate and 466 parts of castor oil were placed in an oven at 168° C. The molar ratio of the ethyl ortho silicate to castor oil in the mixture was 1 to 2. The reaction mixture containing the catalyst set up in 19 hours to a firm gel. The portion without the catalyst required heating at 168° C. for about 30 hours before it became a firm gel.

The applications of the materials of our invention are many and varied because of the wide range of properties obtainable and the low cost of the raw materials and method involved.

Our materials may be used as impregnants for paper wound capacitors where it is desirable to form the gel in situ by subjecting the filled capacitor to the reaction conditions which we describe above. Capacitors impregnated with our material have distinct advantages in simplifying capacitor design, since the problem of leaking, liquid dielectrics is overcome. Other uses of our materials are as transformer coil impregnants, filler for small transformers, etc.

What we claim as new and desire to secure by Letters Patent of the United States, is:

1. The method of preparing gel-like compositions which comprises effecting reaction at temperatures within the range of from about 125° C. to 175° C. between ingredients comprising a lower alkyl ester of ortho silicic acid and an oil selected from the class consisting of castor oil and hydrogenated castor oil in the ratio of from about one mol of said ester to from about 1.5 to 2.5 mols of said oil while removing alcohol formed during said reaction.

2. The gel-like compositions resulting from the method of claim 1.

3. The method of preparing gel-like compositions which comprises effecting reactions at temperatures within the range of from about 125° C. to 175° C. between ingredients comprising lower alkyl ester of ortho silicic acid and an oil selected from the class consisting of castor oil and hydrogenated castor oil in the ratio of one mol of said ester to from about 1.5 to 2.5 mols of said oil, said reaction being effected in the presence of a catalyst for said reaction while removing alcohol formed during the reaction.

4. The method of preparing gel-like compositions which comprises effecting reaction at temperatures within the range of from about 125° C. to 175° C. between ingredients comprising ethyl ortho silicate and castor oil in the ratio of 1 mol of the former to from about 1.5 to 2.5 mols of the latter, while removing alcohol formed during said reaction.

5. The gel-like compositions resulting from the method of claim 4.

6. The method of preparing gel-like compositions which comprises effecting reaction at temperatures within the range of from about 125° C. to 175° C. between ingredients comprising ethyl ortho silicate and hydrogenated castor oil in the ratio of 1 mol of the former to from about 1.5 to 2.5 mols of the latter, while removing alcohol formed during said reaction.

7. The method of preparing a gel-like composition which comprises effecting reaction at a temperature within the range of from 150° C. to 160° C between ingredients comprising ethyl ortho silicate and castor oil in the ratio of 1 mol of the former to approximately 2 mols of the latter, said reaction being effected in the presence of a catalyst for said reaction while removing alcohol formed during the reaction.

HARRY F. MILLER.
RALPH G. FLOWERS.

REFERENCES CITED

The following references are of record in the file of this patent:

UNITED STATES PATENTS

| Number | Name | Date |
| --- | --- | --- |
| 2,048,799 | Lawson | July 28, 1936 |
| 2,270,352 | Sowa | Jan. 20, 1942 |
| 2,278,427 | Colbeth | Apr. 7, 1942 |
| 2,317,361 | Colbeth | Apr. 27, 1943 |